Dec. 24, 1940.  A. KORFF  2,225,957
REDUCTION DRIVE
Filed Aug. 26, 1938   2 Sheets-Sheet 1

INVENTOR:
Abram Korff
BY Kent W. Wonnell
ATTORNEY.

Patented Dec. 24, 1940

2,225,957

UNITED STATES PATENT OFFICE 2,225,957

REDUCTION DRIVE

Abram Korff, Chicago, Ill., assignor to Merkle-Korff Gear Company, Chicago, Ill., a corporation of Illinois Application August 26, 1938, Serial No. 226,931

7 Claims. (Cl. 74—307)

This invention relates in general to a reduction drive and is more particularly described as a differential gear driving unit for reducing the speed of an electric or other motor for any driving connection in which they are adapted to be used.

An important object of the invention is therefore in the provision of speed reduction gearing in which the high speed of a motor is materially reduced for power application.

A further object of the invention is in the provision of a reduction gearing in which the high speed of a low power motor can be utilized to produce a high driving torque at low speed.

A further object of the invention is in the provision of worm and differential spur gearing which are combined to transform small torque at high speed to high torque at low speed.

A still further object of the invention is in the provision of a reduction drive in which gearing is mounted on a shaft in a closed casing to produce the desired reduction in speed but with a frangible joint outside of the casing which protects the gearing and is easily accessible from the outside without opening the gear case.

Figure 1:
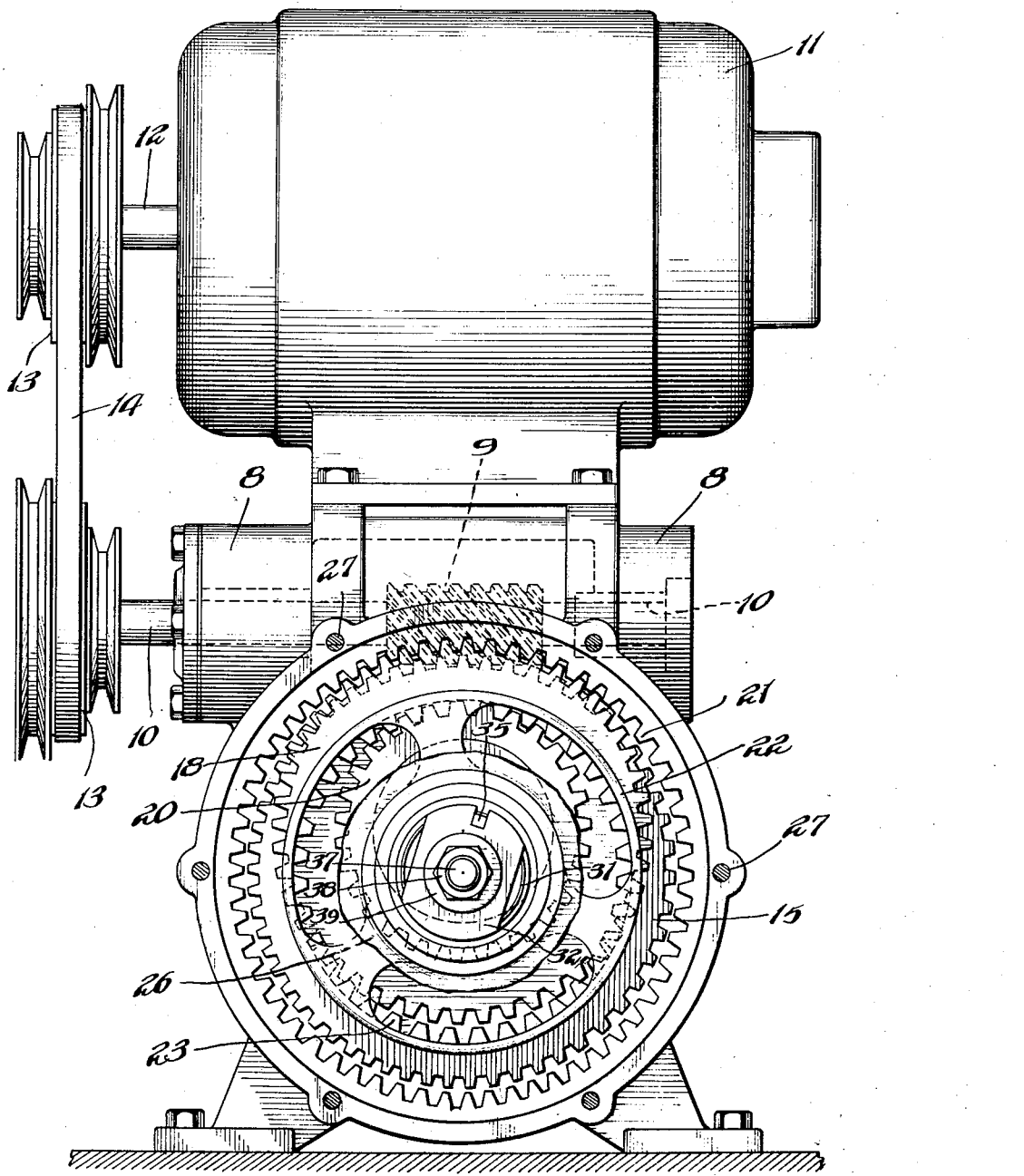
Figure 2:
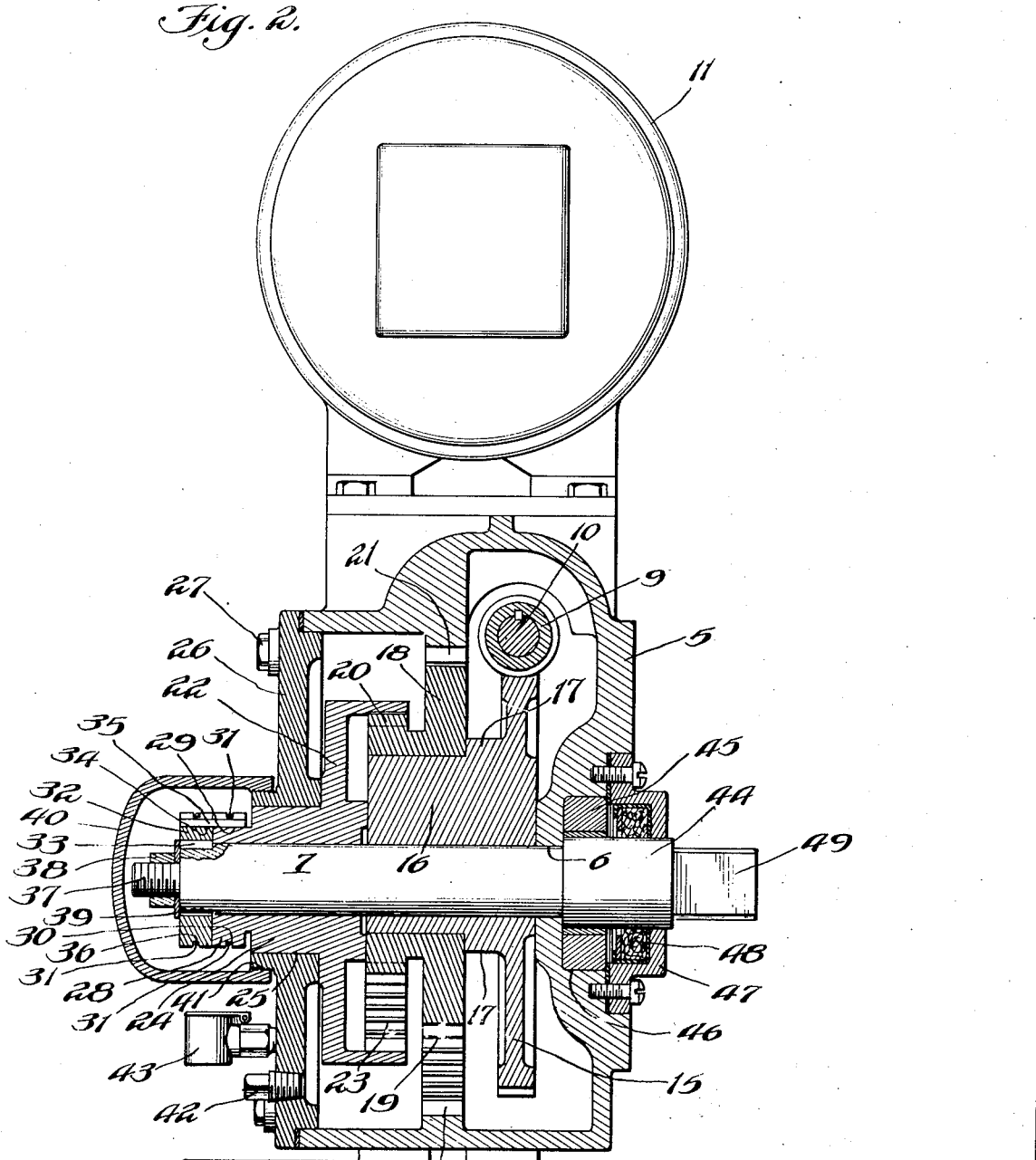

Other objects of the invention will appear hereinafter, the preferred construction being illustrated in the accompanying drawings in which Fig. 1 is an elevation with one cover plate of the gear casing removed, showing the invention; and Fig. 2 is a sectional view through the gearing showing the drive motor in elevation.

In providing a slow speed drive mechanism which requires considerable power it is desirable to use a high speed electric motor of low power in which the necessary and efficient operation of the motor is reduced to a usable amount by a reduction gearing.

In the present invention this reduction is obtained first by drive pulleys, then by a worm gear, and then by a planetary type of reduction gearing which terminates in a driving shaft upon which some of the reduction gears are mounted, the shaft operating at low speed.

Referring now more particularly to the drawings, a gear casing 5 open at one side has a transverse bore 6 at the other side in which a shaft 7 is rotatable. At the upper side of the casing is a somewhat circular housing 8 extending transverse to the shaft 7 containing a worm gear 9 mounted upon a shaft 10 which projects from one end of the housing 8.

At the top of the combined casing and housing is a suitable support for the base of an electric motor 11 having a shaft 12 projecting at one end thereof parallel to the shaft 10 and upon these shaft extremities are secured combination speed reduction pulleys 13 for variously engaging a driving belt 14 for connecting them.

Within the casing 5 and mounted upon the shaft 7 is a gear 15 having teeth in engagement with the worm gear 9 secured to the drive shaft 10. At the center of this gear and formed integral with it at one side is an eccentric bearing portion 16 with a corresponding shoulder 17.

Mounted upon the bearing portion 16 and freely rotatable thereon is a double gear 18 having a large circular gear 19 and a smaller concentric gear 20. Extending inwardly from the casing is an internally toothed gearing 21 which is fixed in place and larger than the gear 19 but having its teeth opposite those of the gear 19 so that as the double gear 18 is rotated upon the eccentric 16 the teeth 19 are caused to roll into engagement with the teeth of the gear 21 but the teeth being less in number will thereupon cause a differential movement of the double gear 18.

Also mounted upon the shaft 7 and abutting the eccentric 16 at one side is a gear member 22 having a toothed portion 23 overhanging and in line with the teeth 20 of the double gear 18 engaged thereby as the double gear member 18 is rotated by its eccentric 16. Thus the reduction in the drive between the gear 15 and the gear member 22 depends upon the difference in teeth between the gears 19 and 21 on one side and the gears 20 and 23 on the other side, and the eccentric 16 causes the rolling engagement of the gear member 18 with both of the internally toothed gears 21 and 23.

Extending laterally from the outer side of the gear member 22 is a central bearing portion 24 seated in an opening 25 of an end plate 26 for closing the open side of the gear casing and suitably held in place by fastening screws 27, thus forming a fixed bearing for this end of the shaft 7.

The extremity of the shaft 7 projects through the plate 26 and beyond the bearing portion 24 of the gear member which is provided at its outer end beyond the plate 26 with a driving projection 28 having a transverse groove 29 and a circular outer groove 30 for seating a spring holding ring 31 therein. Near the outer end of the shaft 7 is a driving collar 32 secured thereto by a key 33 and having a transverse groove 34 corresponding to the groove 29 of the adjacent projection 28 so that a frangible driving key or pin 35 may be inserted in the grooves 34 and 29 connecting the driving member 22 and the driving collar 32, the driving pin being seated and held in the groove of the collar 32 by a spring 31 seated in the circular groove 36 overlying the driving pin.

At the extremity of the shaft 7 is a reduced threaded portion 37 for receiving a nut 38 which holds a washer 39 against the driving collar 32, thus retaining it in place. A protector cap 40 extends over the projecting end of the shaft 7 and encloses the frangible driving connection and the inner end of the cap is secured to a threaded extension of the end plate 26 so that in order to renew the frangible pin 35 it is necessary only to remove the cap 40 and to remove the spring clamping rings 31 from their grooves 30 and 36, or if these rings are split, to turn them to the split portion whereupon the old key may be removed if necessary and a new one inserted, which is thereupon held in place by returning the clamping rings to engagement therewith.

Near the bottom of the plate 26 is a removable plug 42 for draining oil from the crank case and also connected through the plate near the bottom is an oil cup 43 through which oil may be inserted up to the level of the cup opening for lubricating the gears. The rotation of the gears within the casing carries the lubricant upwardly for oiling all of the gears therein.

At the closed side of the casing the shaft 7 may be formed with a bearing enlargement 44 engaged by a bearing member 45 seated in a recess 46 and retained therein by a plate 47 through which the enlarged portion 44 of the shaft extends, the inner side of the cap containing a grease retainer 48 for preventing lubricant from exuding along this end of the shaft. This extremity of the shaft may be formed with a squared portion 49 for any desired driving engagement.

In this construction the driving gears are contained entirely within the housing, the high driving speed of the motor is reduced if desired by the driving pulleys, and is then reduced by the worm and gear drive, and is further reduced by the differential gearing within the casing to the desired speed which is obtained from the power transmitting end of the shaft. The driving gears are mounted upon the shaft which extends through the casing at both ends and the shaft at one end has a frangible driving connection easily accessible without interfering with the connection of the gears within the casing. This reduction drive is therefore adapted to be installed as a complete driving unit, the amount of the reduction depending upon the size of the gears and the connection of the driving pulleys.

I claim:

1. A reduction drive unit comprising a casing having a rotatable shaft mounted therein, a fixed internal gear in the casing concentric with the shaft, a gear mounted freely on the shaft in the casing having an eccentric central projection at one side, means to rotate the gear on the shaft, a gear secured to the shaft having an internally toothed portion extending toward the other gear, and a differential gear member rotatable upon the eccentric projection having two externally toothed portions, one engaging the fixed internal gear in the casing and the other engaging the teeth of the gear secured to the shaft, the hub of the gear secured to the shaft having a frangible connection with the end of the shaft to which it is secured.

2. In a reduction drive, a casing having a closure plate at one side, a shaft rotatable in the casing having its extremities extending through the plate and the opposite wall of the casing, differential gearing mounted on the shaft in the casing and means for driving it, the gearing including an end gear member with a concentric hub projection fitting and extending through an opening in the closure plate to form a bearing for the adjacent end of the shaft, the wall of the casing forming the bearing for the other end of the shaft, and means outside of said closure plate connecting the shaft and the projecting end of the hub.

3. In a reduction drive, a gear casing having a reducing gear train therein and means for driving it, a shaft upon which gears in the casing are mounted having its ends projecting through opposite sides of the casing, the last gear of the train having a hub portion extending outside of the casing adjacent one end of the shaft, a collar secured to this end of the shaft adjacent the said hub portion, the collar and hub portions having registering transverse slots, and a frangible drive pin seated in the slots for holding the gear to the shaft, the shaft driving connection being at the other end.

4. A reduction drive in accordance with claim 3 in which the said collar and hub portions are formed with outer grooves in which spring rings are seated for engaging and holding the frangible drive pin in the said slots.

5. A reduction drive in accordance with claim 3 in which the casing at the drive pin end is provided with a threaded portion surrounding the shaft, and a cap is threaded thereon to cover the end of the shaft and the drive pin connection which is accessible by removing the cap without interfering with the driving connection of the shaft at the other end or with the interior of the casing.

6. A reduction drive comprising a casing, a shaft extending through the casing, a gear freely mounted on the shaft in the casing, a worm drive for the gear, the gear having an eccentric projection at one side of the hub, a fixed internal gear in the casing concentric with the shaft, a gear fixed to the shaft having an internal toothed portion overlying and of greater diameter than the said eccentric projection, and a double gear member mounted to rotate on the eccentric projection, one threaded portion to engage the internal gear of the casing and the other to engage the internal gear of the gear fixed to the shaft, the eccentric projection maintaining the double gear in rolling engagement with both internal gears to cause a differential movement between the movable and fixed gears on the shaft, the gear fixed to the shaft having a frangible connection with the end of the shaft accessible at the end thereof without disturbing the gears.

7. In a reduction drive, a casing having an internal gear therein, a shaft rotatable in the casing concentric with the axis of the internal gear, a gear rotatable on the shaft having an eccentric hub projection, within the casing gear, a gear fixed to the shaft having an internal gear overlying the end of the eccentric hub, and a double gear mounted to rotate on the eccentric projection having one portion to engage the casing gear and another smaller portion to engage the overlying internal gear, the eccentric projection keeping both double gear portions in rolling contact with the internal gears as the gear is rotated on the shaft and the reduction in speed given to the shaft depending upon the difference in the number of teeth between the double gear portions and the internal gears the gear fixed to the shaft having a hub forming a bearing therefor and the end of the hub having a frangible connection with the end of the shaft outside of the bearing.

ABRAM KORFF.